(12) United States Patent
Pentek et al.

(10) Patent No.: US 7,562,437 B2
(45) Date of Patent: Jul. 21, 2009

(54) METHOD OF MANUFACTURING A WRAP AROUND SHIELD FOR A PERPENDICULAR WRITE POLE USING A LAMINATED MASK

(75) Inventors: Aron Pentek, San Jose, CA (US); Yi Zheng, San Ramon, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 274 days.

(21) Appl. No.: 11/412,038

(22) Filed: Apr. 25, 2006

(65) Prior Publication Data

US 2007/0245545 A1 Oct. 25, 2007

(51) Int. Cl.
*G11B 5/127* (2006.01)
*H04R 31/00* (2006.01)

(52) U.S. Cl. .............. 29/603.16; 29/603.13; 29/603.14; 29/603.15; 29/603.18; 205/119; 205/122; 360/121; 360/122; 360/317; 451/5; 451/41

(58) Field of Classification Search . 29/603.13–603.16, 29/603.18; 205/199, 122; 360/126, 317; 427/127, 128; 451/5, 41
See application file for complete search history.

(56) References Cited

U.S. PATENT DOCUMENTS

| | | | |
|---|---|---|---|
| 5,639,509 A | 6/1997 | Schemmel | 427/130 |
| 6,836,956 B2* | 1/2005 | Sasaki | 29/603.15 |
| 6,848,166 B2 | 2/2005 | Lee | 29/602.12 |
| 6,950,277 B1 | 9/2005 | Nguy et al. | 360/119 |
| 2002/0191350 A1 | 12/2002 | Emilio Santini | 360/317 |
| 2004/0212924 A1 | 10/2004 | Lee | 360/126 |
| 2005/0024771 A1 | 2/2005 | Le | 360/126 |
| 2005/0024779 A1 | 2/2005 | Le et al. | 360/317 |
| 2005/0068665 A1 | 3/2005 | Le et al. | 360/97.01 |
| 2005/0141137 A1 | 6/2005 | Okada et al. | 360/122 |
| 2005/0190491 A1 | 9/2005 | Le et al. | 360/122 |
| 2005/0193550 A1 | 9/2005 | Guthrie et al. | 29/603.14 |
| 2005/0219744 A1 | 10/2005 | Feldbaum et al. | 360/126 |

OTHER PUBLICATIONS

Chinese Office Action Summary from application No. 2007/10101866.1 Copy mailed on Jan. 24, 2009.

* cited by examiner

*Primary Examiner*—Paul D Kim
(74) *Attorney, Agent, or Firm*—Zilka-Kotab, PC

(57) ABSTRACT

A method for constructing a magnetic write head for use in perpendicular magnetic recording, the write head having a write pole with a trailing shield that wraps around the write pole. The method allows the trailing shield to be constructed with a very well controlled trailing gap thickness and also allows the write pole to be constructed with a well controlled track width and a straight, flat trailing edge. The method includes depositing a magnetic write pole over a substrate and forming a mask structure over the write pole layer. The mask structure includes an end point detection layer that can be removed by reactive ion etching. An ion mill is performed to form a write pole by removing magnetic write pole material that is not covered by the mask layer. A layer of non-magnetic material is deposited and is ion milled to expose the end point detection layer.

20 Claims, 20 Drawing Sheets

METHOD OF MANUFACTURING A WRAP AROUND SHIELD FOR A PERPENDICULAR WRITE POLE USING A LAMINATED MASK

FIELD OF THE INVENTION

The present invention relates to perpendicular magnetic recording and more particularly to a novel trailing magnetic shield design and a method for manufacturing such a shield design.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head traditionally includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos $\theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

When a spin valve sensor employs a single pinned layer it is referred to as a simple spin valve. When a spin valve employs an antiparallel (AP) pinned layer it is referred to as an AP pinned spin valve. An AP spin valve includes first and second magnetic layers separated by a thin non-magnetic coupling layer such as Ru. The thickness of the spacer layer is chosen so as to be antiparallel coupled to the magnetizations of the ferromagnetic layers of the pinned layer. A spin valve is also known as a top or bottom spin valve depending upon whether the pinning layer is at the top (formed after the free layer) or at the bottom (before the free layer).

The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

Magnetization of the pinned layer is usually fixed by exchange coupling one of the ferromagnetic layers (AP1) with a layer of antiferromagnetic material such as PtMn. While an antiferromagnetic (AFM) material such as PtMn does not in and of itself have a magnetization, when exchange coupled with a magnetic material, it can strongly pin the magnetization of the ferromagnetic layer.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

One of the features of perpendicular recording systems is that the high coercivity top layer of the magnetic medium has a high switching field. This means that a strong magnetic field is needed to switch the magnetic moment of the medium when writing a magnetic bit of data. In order to decrease the switching field and increase recording speed, attempts have been made to angle or "cant" the write field being emitted from the write pole. Canting the write field at an angle relative to the normal of the medium makes the magnetic moment of the medium easier to switch by reducing the switching field.

Modeling has shown that a single pole writer in a perpendicular recording system can exhibit improved transition sharpness (i.e. better field gradient and resolution), achieve better media signal to noise ratio, and permit higher coercive field media for higher areal density magnetic recording if, according to the Stoner-Wohlfarth model for a single particle, the effective flux field is angled. A method that has been investigated to cant the magnetic field has been to provide a trailing magnetic shield adjacent to the write head, to magnetically attract the field from the write pole.

The trailing shield can be a floating design, in that the magnetic trailing shield is not directly, magnetically connected with the other structures of the write head. Magnetic field from the write pole results in a flux in the shield that essentially travels through the magnetic medium back to the return pole of the write head. Various dimensions of the shield are critical for the floating trailing shield to operate correctly. For instance, effective angling or canting of the effective flux field is optimized when the write pole to trailing shield separation (gap) is about equal to the head to soft underlayer spacing (HUS) and the trailing shield throat height is roughly equal to half the track-width of the write pole. This design improves write field gradient at the expense of effective flux field. To minimize effective flux field lost to the trailing shield and still achieve the desired effect, the gap and shield thickness are adjusted to minimize saturation at the shield and effective flux field lost to the shield respectively. In order for a trailing shield to function optimally, the thickness of the trailing shield gap must be tightly controlled. Therefore, there is a need for a means for accurately controlling such trailing gap thickness during manufacture.

In addition, the track width and shape of the write pole must be tightly controlled. The write pole is preferably configured with a trapezoidal shape and preferably has a straight flat trailing edge. The write pole can be formed by ion milling a magnetic material at such an angle or combination of angles that a write pole having the desired trapezoidal shape is formed. A challenge to creating such a well defined pole structure is that the mask used during ion milling must be thick and robust to withstand the aggressive ion mill and form a write pole having a well controlled track width and flat, straight trailing edge. Such a mask structure does not lend itself well to functioning as a trailing shield gap, because, after the ion mill, the remaining mask is not flat and does not have the desired small, well controlled thickness to function as a trailing shield gap.

Therefore, there is a need for a method for manufacturing a perpendicular write head that can produce a write pole having a well controlled track width and flat trailing edge, while still producing a trailing, wrap around shield that has a trailing gap with a well controlled thickness and shape.

SUMMARY OF THE INVENTION

The present invention provides a method for manufacturing a magnetic write head for perpendicular recording having a wrap around trailing shield. The method includes depositing a magnetic write pole material over a substrate and then forming mask structure over the magnetic write pole material. The mask structure includes a hard mask layer and an end point detection layer. An ion mill is performed to remove magnetic write pole material not covered by the mask structure to form the write pole. A non-magnetic material is then deposited and another ion mill is performed to remove the non-magnetic material until the end point detection layer has been reached. The end point detection layer is then removed by reactive ion etching (RIE) and a magnetic material is deposited to form the trailing wrap around shield.

The mask structure can be formed so that the end point detection layer sits on the hard mask, which may be alumina. The hard mask has a thickness that is chosen to provide a desired trailing shield gap thickness. After the end point detection layer has been removed, and the magnetic shield material has been deposited, the hard mask layer functions as a trailing gap.

Alternatively, the mask structure can be formed with the end point detection layer sitting directly on top of the magnetic pole material and a hard mask layer may be formed on top of the end point diction layer. After ion milling has exposed the end point detection layer, a layer of non-magnetic trailing shield gap material is deposited and a magnetic material is deposited to form the wrap around trailing shield. The non-magnetic trailing shield gap material can be electrically conductive, in which case it can function as a seed layer for electroplating the shield. Alternatively, the non-magnetic trailing shield gap layer can be an electrically insulating material, in which case an electrically conductive seed layer can be deposited prior to depositing the magnetic shield material.

A method according to the present invention allows the write pole to be constructed with a well defined track width and a flat, straight trailing edge. The method also allows the trailing shield to be formed with a well controlled trailing gap thickness.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
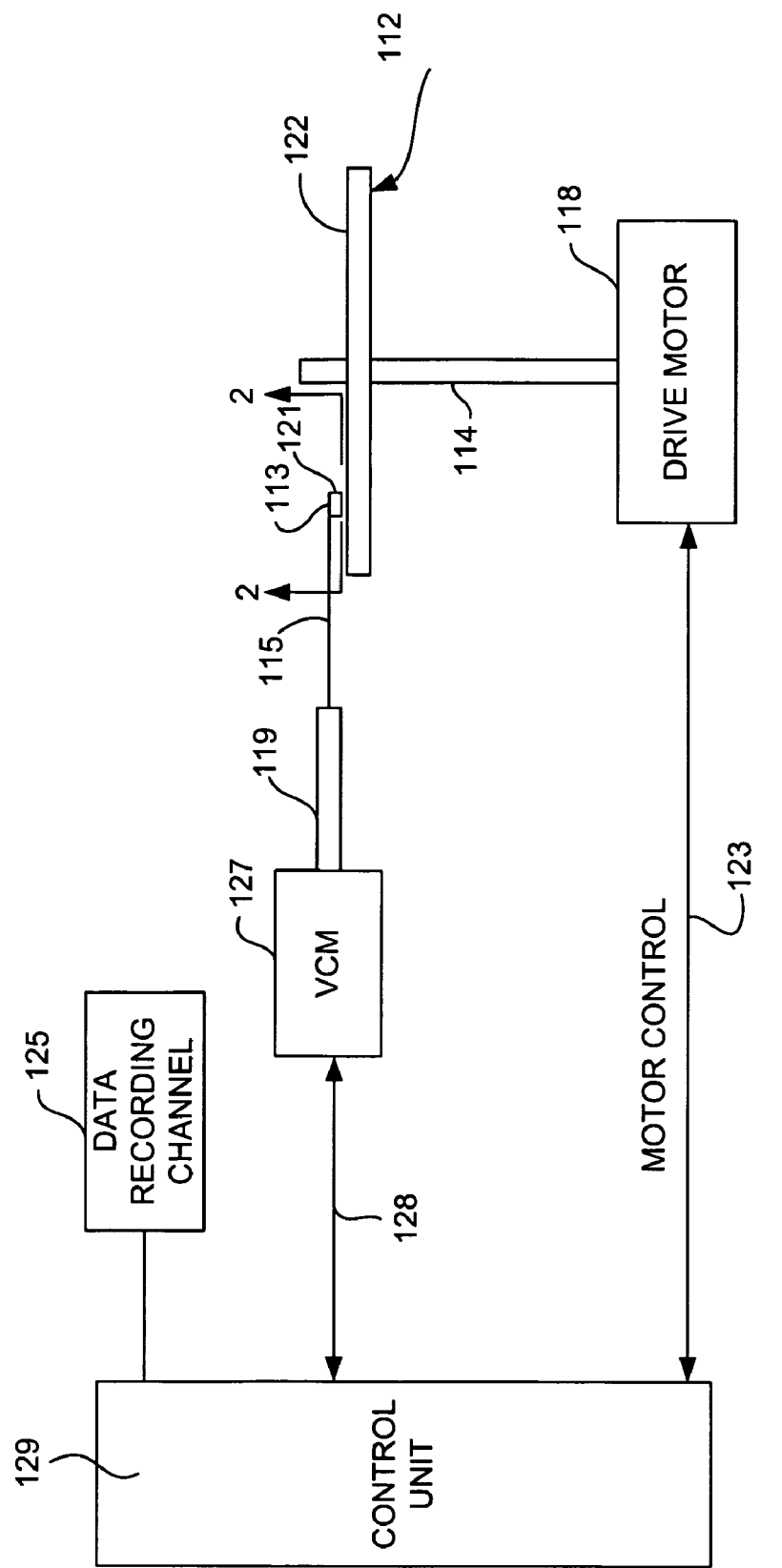
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 221. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
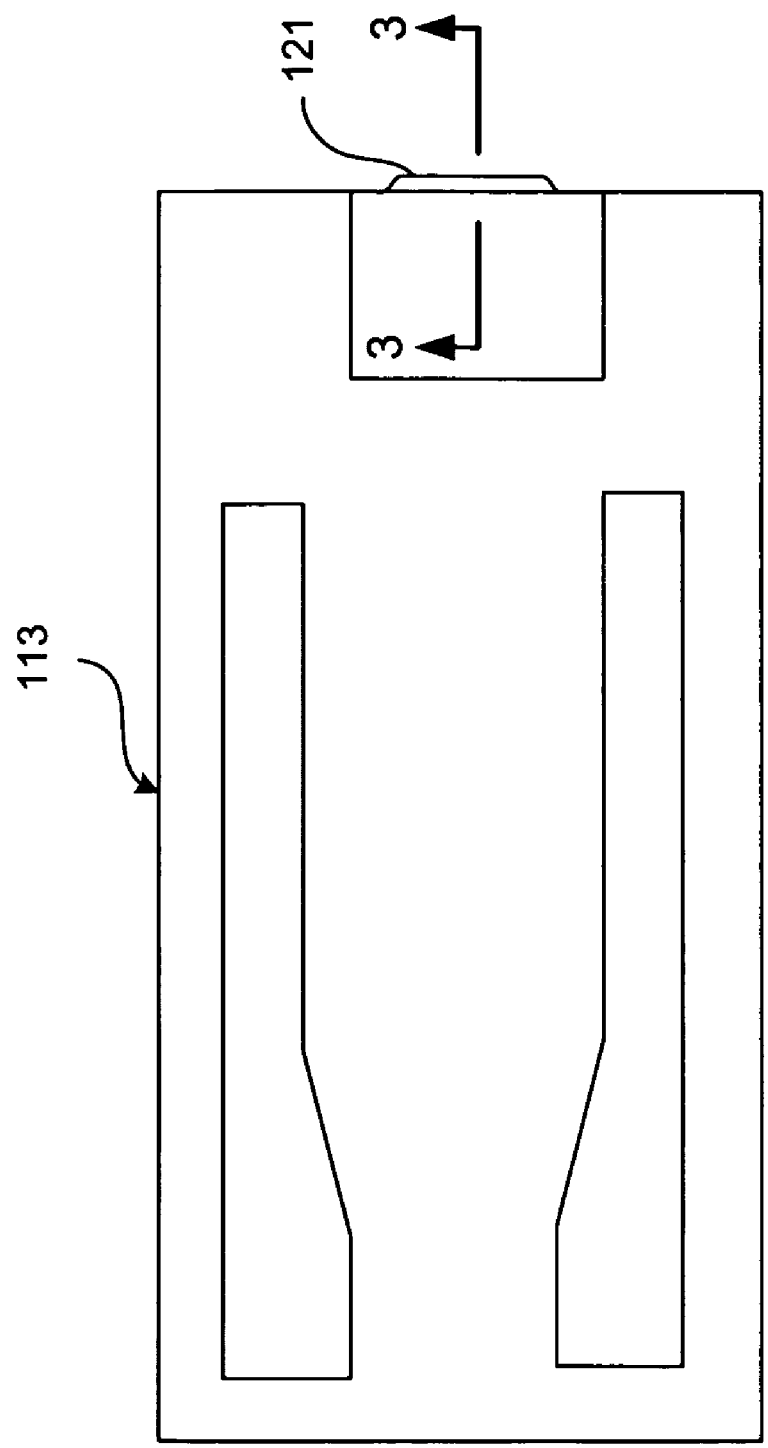
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
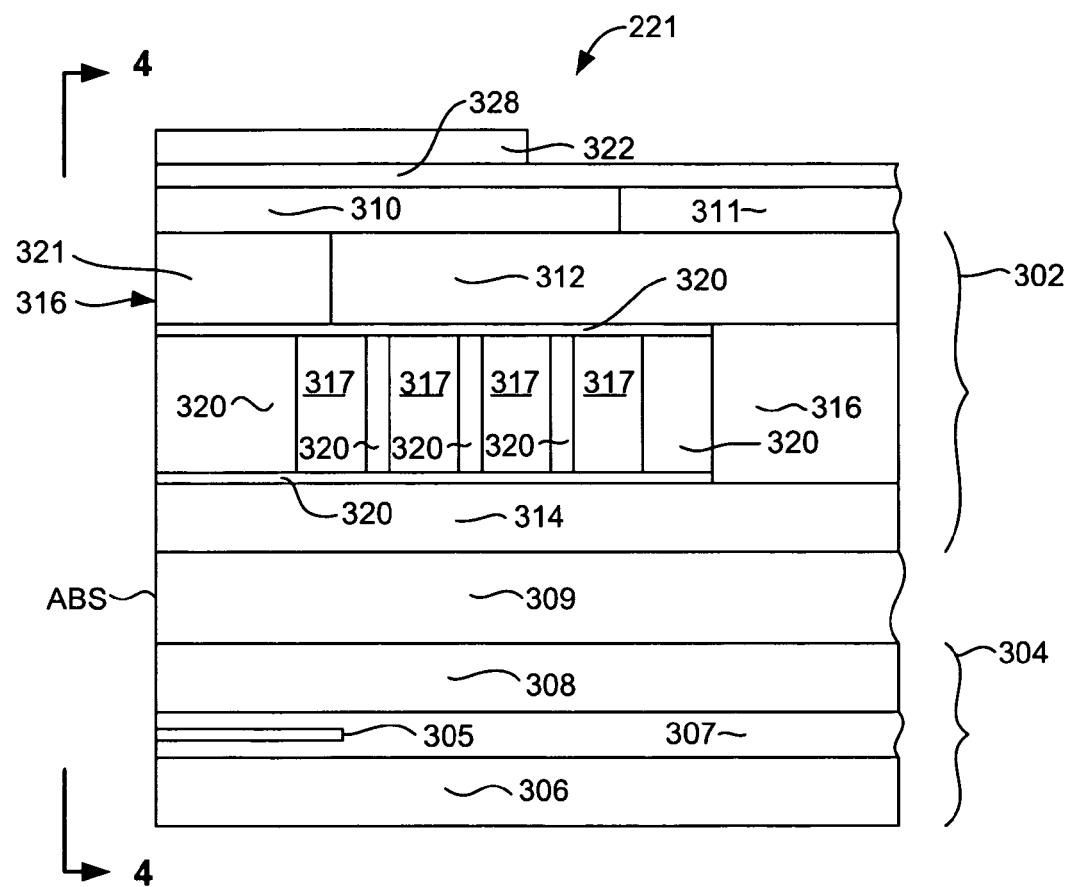
FIG. 3 is a cross sectional view, taken from line 3-3 of FIG. 2 and rotated 90 degrees counterclockwise, of a magnetic head according to an embodiment of the present invention.

With reference now to FIG. 3, the magnetic head 221 for use in a perpendicular magnetic recording system is described. The head 221 includes a write element 302 and a read element 304 that includes a magnetoresistive sensor 305. The read sensor 305 is preferably a giant magnetoresistive (GMR) sensor and is preferably a current perpendicular to plane (CPP) GMR sensor. CPP GMR sensors are particularly well suited for use in perpendicular recording systems. However, the sensor 305 could be another type of sensor such as a current in plane (CIP) GMR sensor or, a tunnel junction sensor (TMR) or some other type of sensor. The sensor 305 is located between and insulated from first and second magnetic shields 306, 308 and embedded in a dielectric material 307. The magnetic shields, which can be constructed of for example CoFe or NiFe, absorb magnetic fields, such as those from uptrack or down track data signals, ensuring that the read sensor 304 only detects the desired data track located between the shields 306, 308. A non-magnetic, electrically insulating gap layer 309 may be provided between the shield 308 and the write head 302.

With continued reference to FIG. 3, the write element 302 includes a write pole 310 that is magnetically connected with a magnetic shaping layer 312, and is embedded within an insulation material 311. The write pole 310 has a small cross section at the air bearing surface and is constructed of a material having a high saturation moment, such as NiFe or CoFe. The shaping layer 312 is constructed of a magnetic material such as CoFe or NiFe.

The write element 302 also has a return pole 314 that preferably has a surface exposed at the ABS and has a cross section parallel with the ABS surface that is much larger than that of the write pole 310. This can be seen more clearly with reference to FIG. 4, which shows the head 221 as viewed from the air bearing surface (ABS). The return pole 314 is magnetically connected with the shaping layer 312 by a back gap portion 316. The return pole 314 and back gap 316 can be constructed of, for example, NiFe, CoFe or some other magnetic material.

An electrically conductive write coil 317, shown in cross section in FIG. 3, passes through the write element 302 between the shaping layer 312, and the return pole 314. The write coil 317 is surrounded by an electrically insulating material 320 that electrically insulates the turns of the coil 317 from one another and electrically isolates the coil 317 from the surrounding magnetic structures 310, 312, 316, 314. When a current passes through the coil 317, the resulting magnetic field causes a magnetic flux to flow through the return pole 314, back gap 316, shaping layer 312 and write pole 310. This magnetic flux causes a write field to be emitted toward an adjacent magnetic medium (not shown in FIGS. 3 and 4). The shaping layer 312 is also surrounded by an insulation layer 321 which separates the shaping layer 312 from the ABS. The insulation layers 320, 321, 311 can all be constructed of the same material, such as alumina ($Al_2O_3$) or of different electrically insulating materials.

Figure 4:
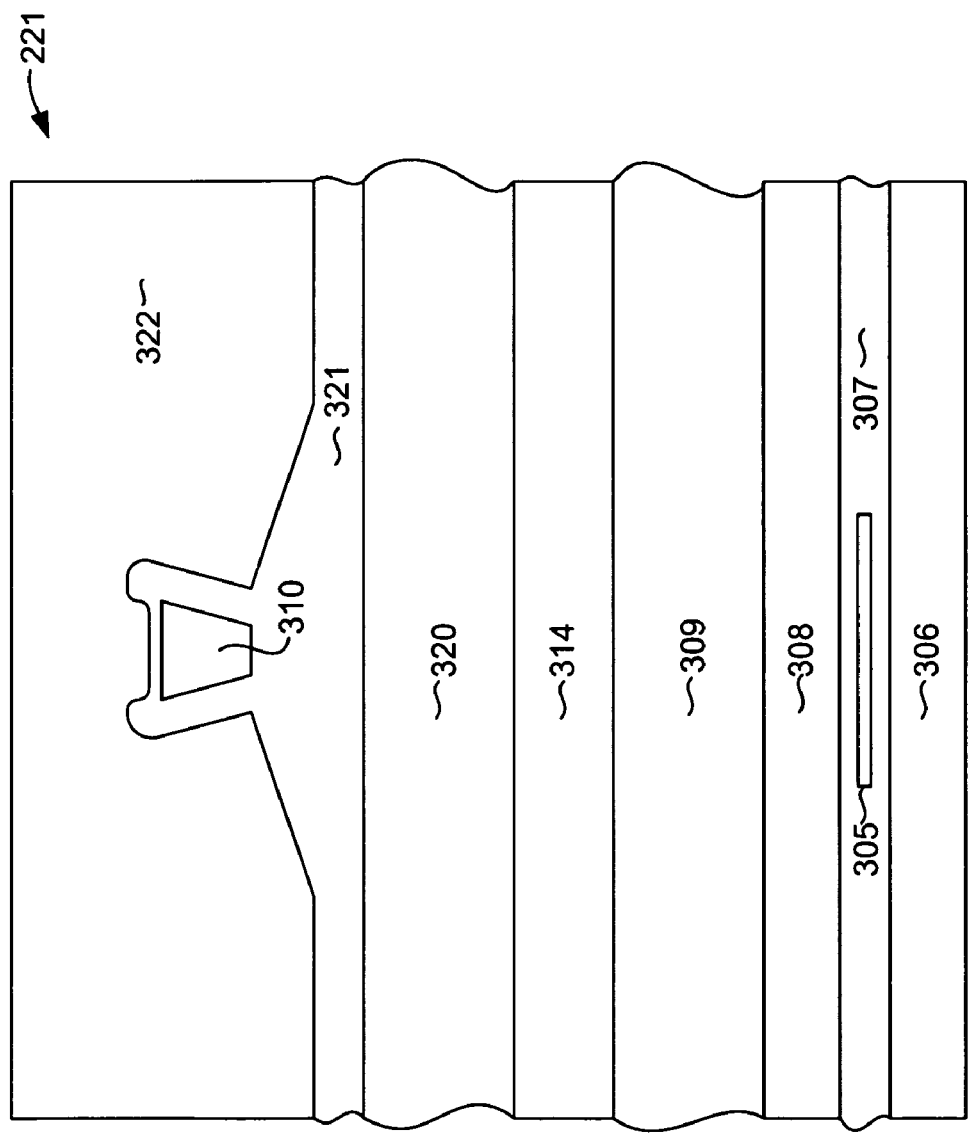
FIG. 4 is an ABS view of the write head taken from line 4-4 of FIG. 3

The write head element 302 also includes a trailing shield 322. With reference to FIG. 4, the trailing shield 322 wraps around the write pole 310 to provide side shielding as well as trailing shielding from stray magnetic fields. These stray magnetic fields can be from portions of the write head 302 itself, or could also be from adjacent track signals or from magnetic fields from external sources.

Figure 5:
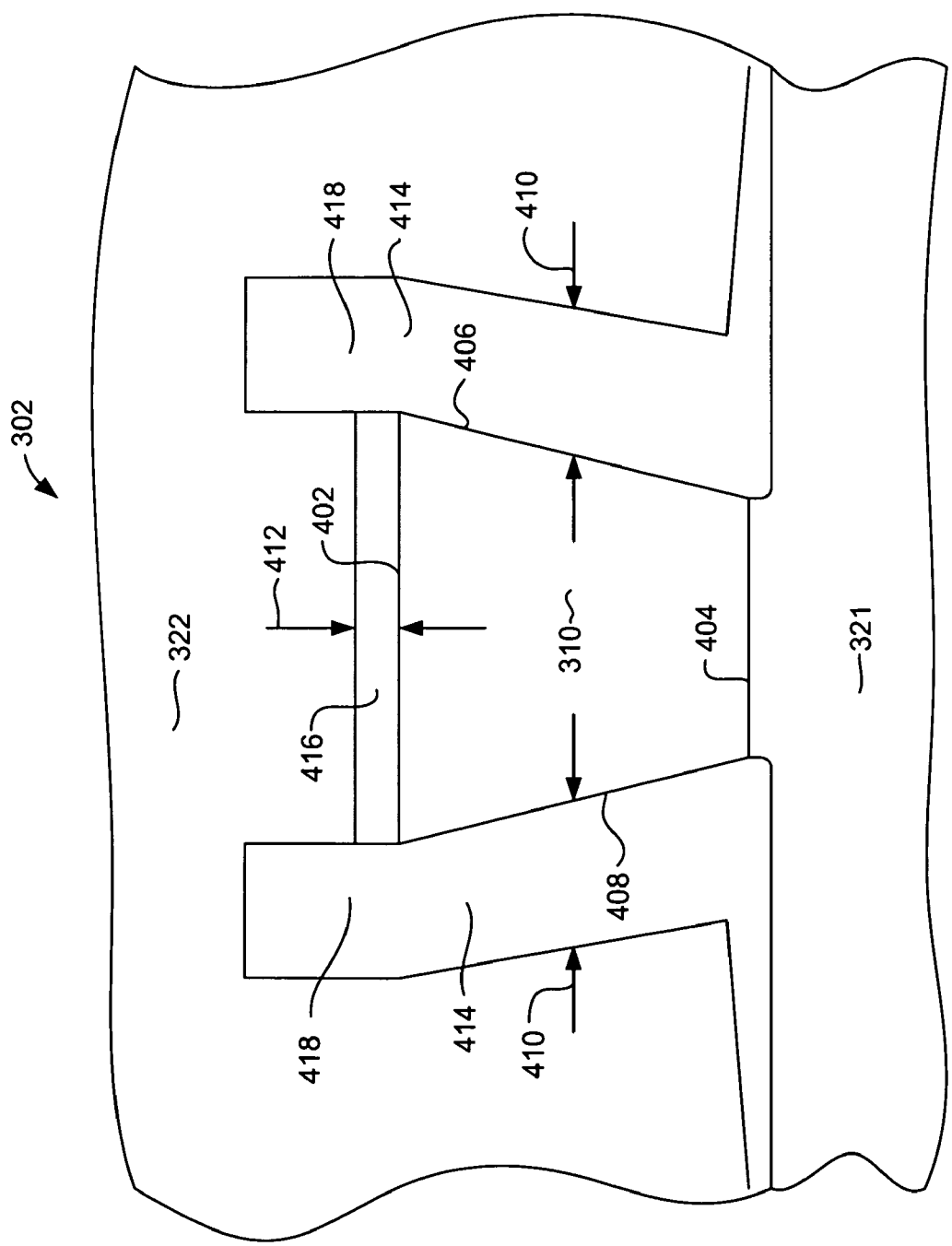
FIG. 5 is an enlarged view of a write pole and surrounding structure.

With reference now to FIG. 5 the configuration of the write pole 310 and the surrounding portions of the trailing shield 322 are shown enlarged and in greater detail. The write pole 310 has a trailing edge 402 and a leading edge 404. The terms trailing and leading are with respect to the direction of travel along a data track when the write head 302 is in use. The write pole 310 also preferably has first and second laterally opposing sides 406, 408 that are configured to define a width at the leading edge 404 that is narrower than the width at the trailing edge 402, forming a write pole 310 having a trapezoidal shape. This trapezoidal shape is useful in preventing adjacent track writing due to skew of the write head 302 when the head 302 is located at extreme outer or inner positions over the disk, however, this trapezoidal shape of the write head 310 is not necessary to practice the present invention.

With continued reference to FIG. 5, the magnetic trailing shield 322 is separated from each side 406, 408 of the write pole 310 by a side gap 410. The trailing shield 322 is also separated from the trailing shield, by a trailing gap 412. The thickness of each of the side gaps 410 is preferably about 1.5 to 2.5 or about 2 times the thickness of the trailing gap 412. The materials defining and filling the side and trailing gaps 410, 412 are preferably non-magnetic materials and may be the same materials or may be different materials. Preferably, the side gaps include a non-magnetic layer 414, which may be for example alumina. The trailing shield gap 412 is constructed of a non-magnetic material 416, which is preferably alumina.

As can be seen with reference to FIG. 4B, the trailing shield 322 can be configured with notches 418 at either side of the write pole 310. The notches can be described as extensions of the side gaps 410 that extend in the trailing direction slightly beyond the trailing edge gap 412. The notches 418 are an artifact of a process for constructing the trailing shield 322 by a process that will be described below, but also serve to improve the magnetic performance of the write element 302. The trailing shield 322 can be constructed of a magnetic material such as NiFe.

Figure 6:
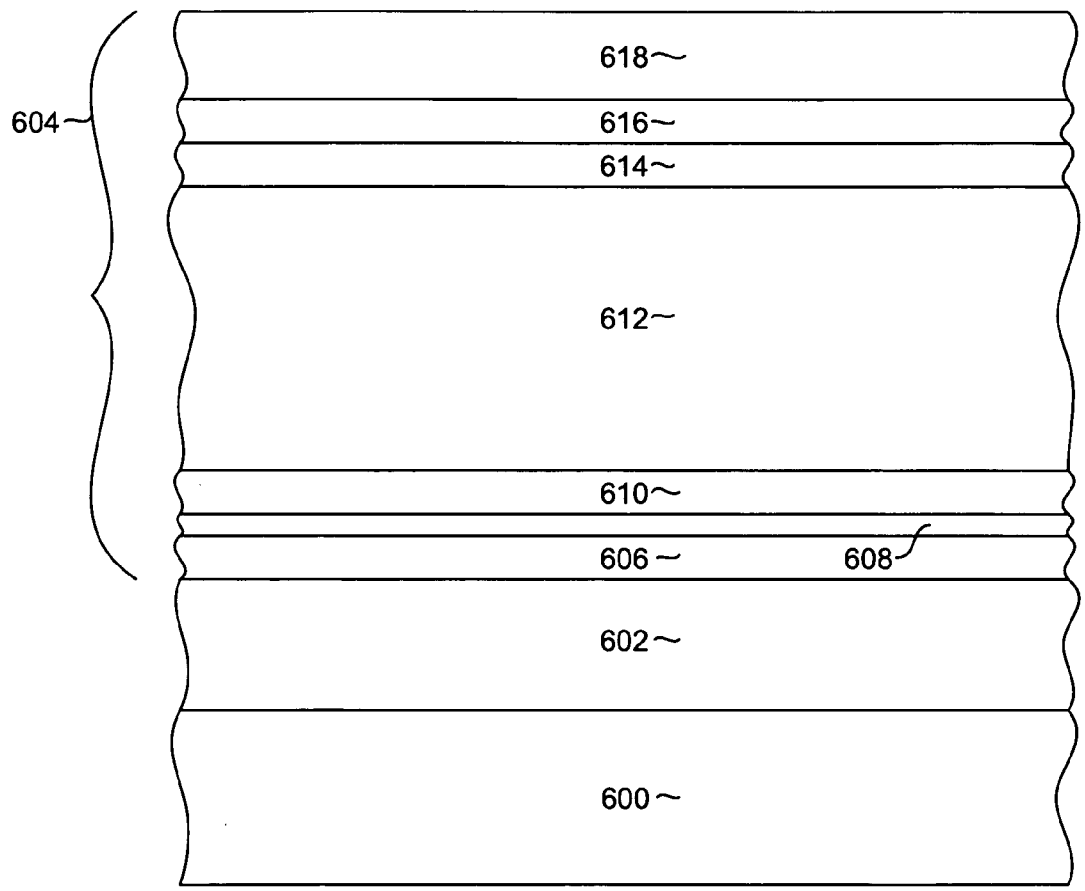
FIGS. 6-15 are ABS views similar to that of FIGS. 4 and 5, showing a magnetic head in various intermediate stages of manufacture and illustrating a method of manufacturing a magnetic head according to an embodiment of the invention.

With reference now to FIGS. 6 through 15, a method for constructing a write pole and a wrap around trailing shield according to an embodiment is described. With particular reference to FIG. 6, a substrate layer 600 is provided. The substrate 600 can include the non-magnetic fill layer 321 and the shaping layer 312 on which the write pole 310 is to be formed (FIG. 3). One or more layers of write pole material 602 are deposited over the substrate 600. The write pole layer 604 preferably is a lamination of magnetic layers such as CoFe with thin layers of non-magnetic material sandwiched between the magnetic layers.

A plurality of mask layers 604 are deposited over the write pole layer (lamination) 602. The mask layers include first and second hard mask layers 606, 610, with an ion mill endpoint detection layer 608 sandwiched between the hard mask layers 606, 610. The first and second hard mask layers 606, 610 are preferably constructed of alumina. The ion mill endpoint detection layer 608 is preferably constructed of a material that can be easily detected during ion milling. This material 608 also preferably is resistant to removal by ion milling, is removable by reactive ion etching (RIE) and has a high mass (atomic mass) compared with the material making up the hard mask layers 606, 610. Therefore, suitable materials for use in the layer 608 include $Ta_2O_5$, Ta, $SiO_2$, etc. The first hard mask layer 606, can be 5-30 nm thick or about 20 nm thick. The thickness of the first hard mask layer is chosen to provide a desired trailing gap thickness, as will be seen below. The ion mill end point detection layer 608 can be 2-30 nm thick or about 15 nm thick and the second hard mask layer 610 can be about 5-45 nm thick or about 25 nm thick.

With continued reference to FIG. 6, the mask layers further include a first image transfer layer 612, which can be a soluble polyimide layer such as DURIMIDE®. The first image transfer layer can be, for example, 1000 to 1400 nm or about 1200 nm. Another hard mask layer 614 such as, for example silicon dioxide ($SiO_2$) can be deposited over the first image transfer layer, and a second thinner image transfer layer 616, which can also be a soluble polyimide such as DURIMIDE® can be formed over the top hard mask 614. The top hard mask 614 can be 60 to 150 nm thick or about 90 nm thick. The second, or top, image transfer layer 616 can be 100 to 130 nm thick or about 115 nm thick. A layer of resist material such as photoresist or e-beam resist 618 is deposited at the top of the mask layers 604.

Figure 7:
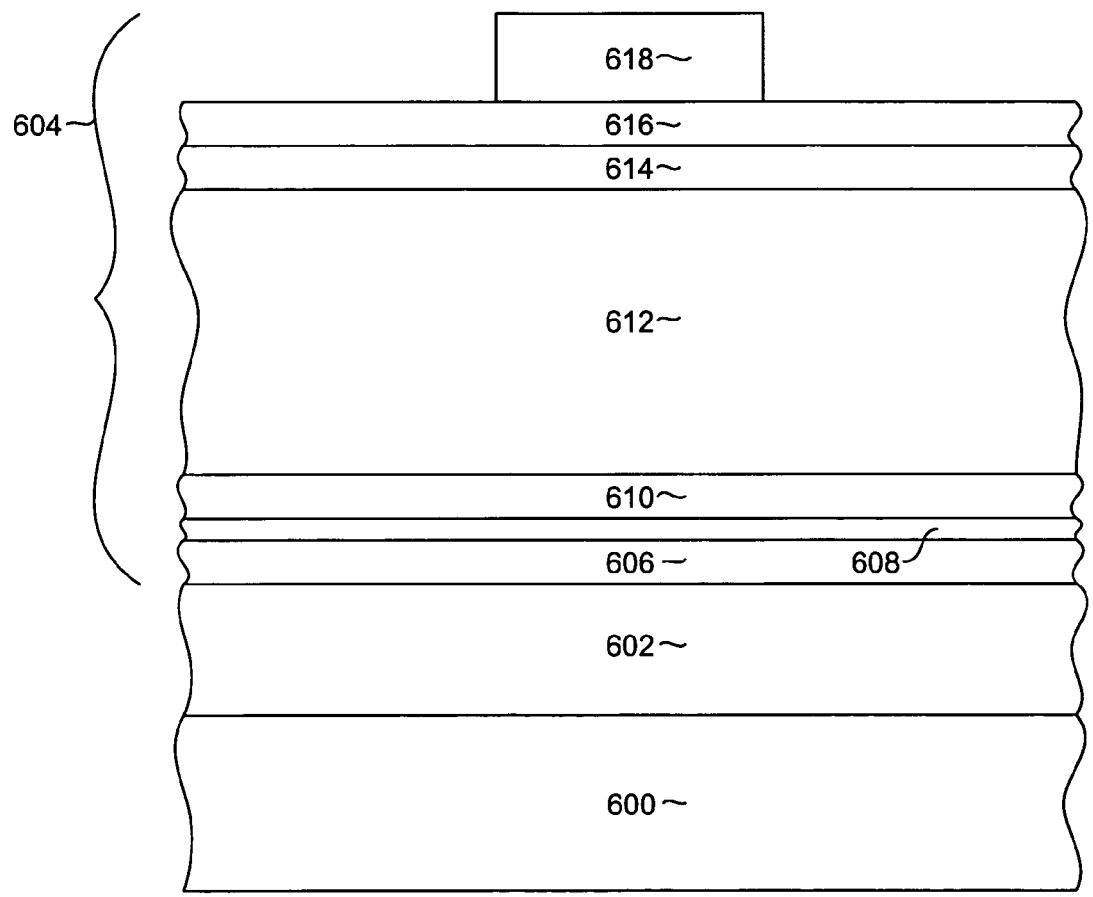

With reference now to FIG. 7, the resist layer is photolithographically patterned, such as by photolithography or electron beam (e-beam) lithography. After exposure, the photo layer is developed in an appropriate developing solution. The photo layer 618 is patterned to have a width to define a desired write pole track width, as will be further described herein below.

Figure 8:
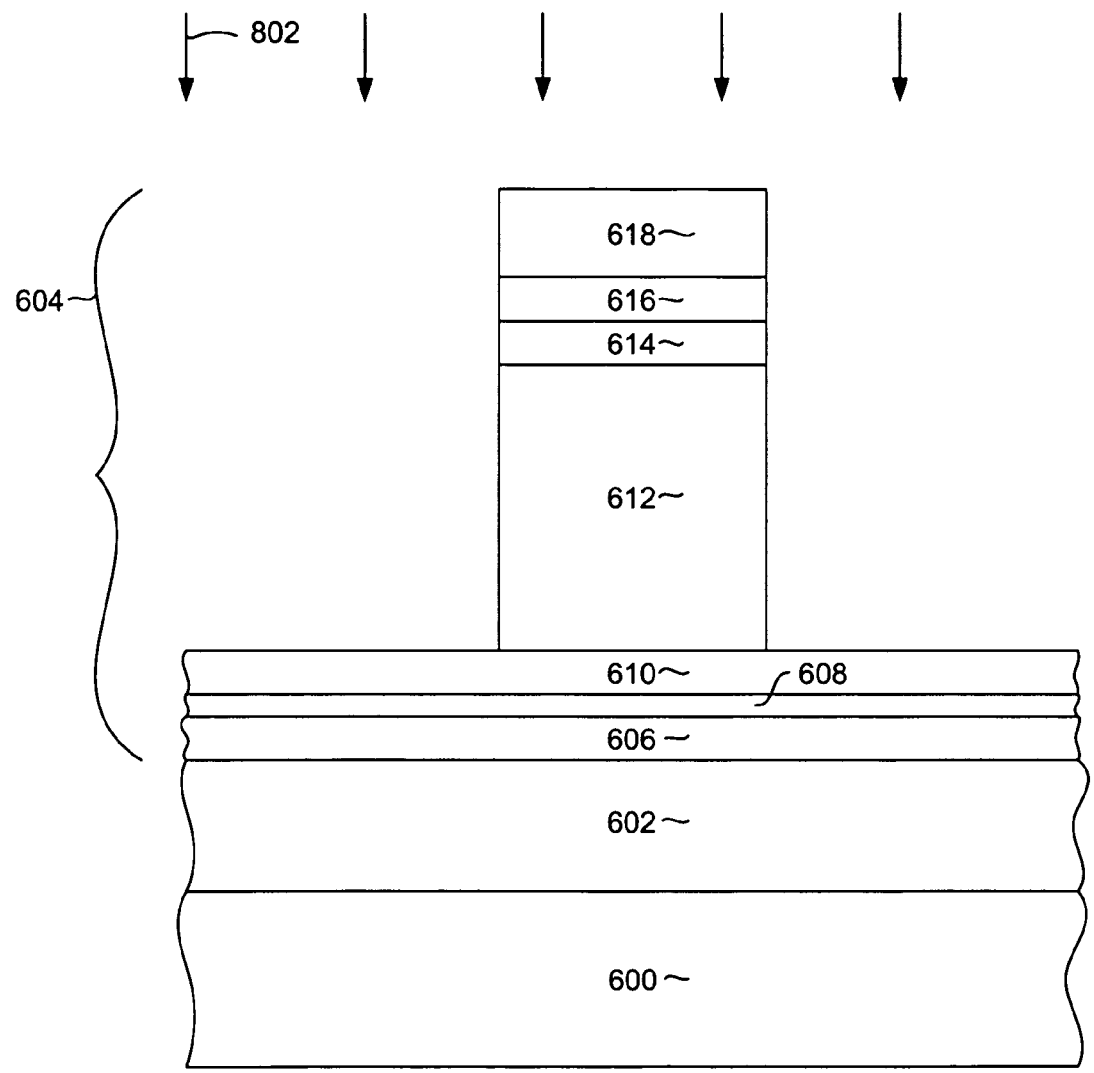
Figure 9:
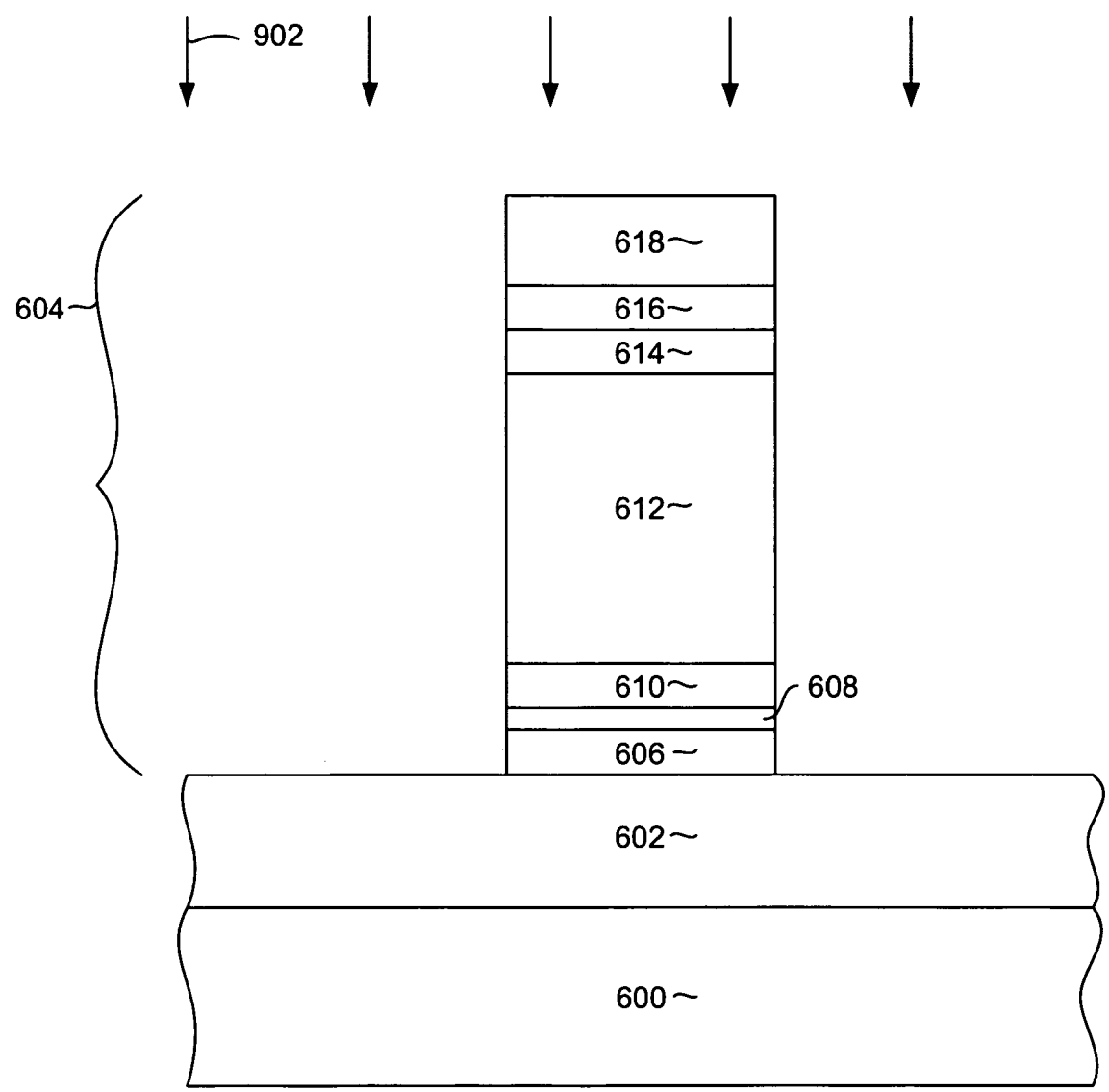

With reference now to FIG. 8, a reactive ion etch (RIE) 802 is performed to transfer the image of the photoresist mask 618 onto the underlying image transfer layers 612, 618 and top hard mask 616, by removing portions of the layers that are not covered by the photo mask 802. The RIE 802 can be performed in a fluorine chemistry such as a CF4 or $CHF_3$ chemistry. Then, with reference to FIG. 9, a reactive ion mill 902 is performed to transfer the image of the overlying mask layers 612, 614, 616 and 618 onto the first and second hard mask layers 606, 610 and ion mill endpoint detection layer 608. The ion milling 902 can be performed with and Ar or $CHF_3$ based process depending on the materials used in the hard mask layers 606, 610 and end point detection layer 608. The above described material removal processes are by way of example, however. The choice of which material removal processes are used to transfer the image of the photo layer 618 onto the underlying mask layers 606-616 will depend upon the materials used for these layers 606-616.

Figure 10:
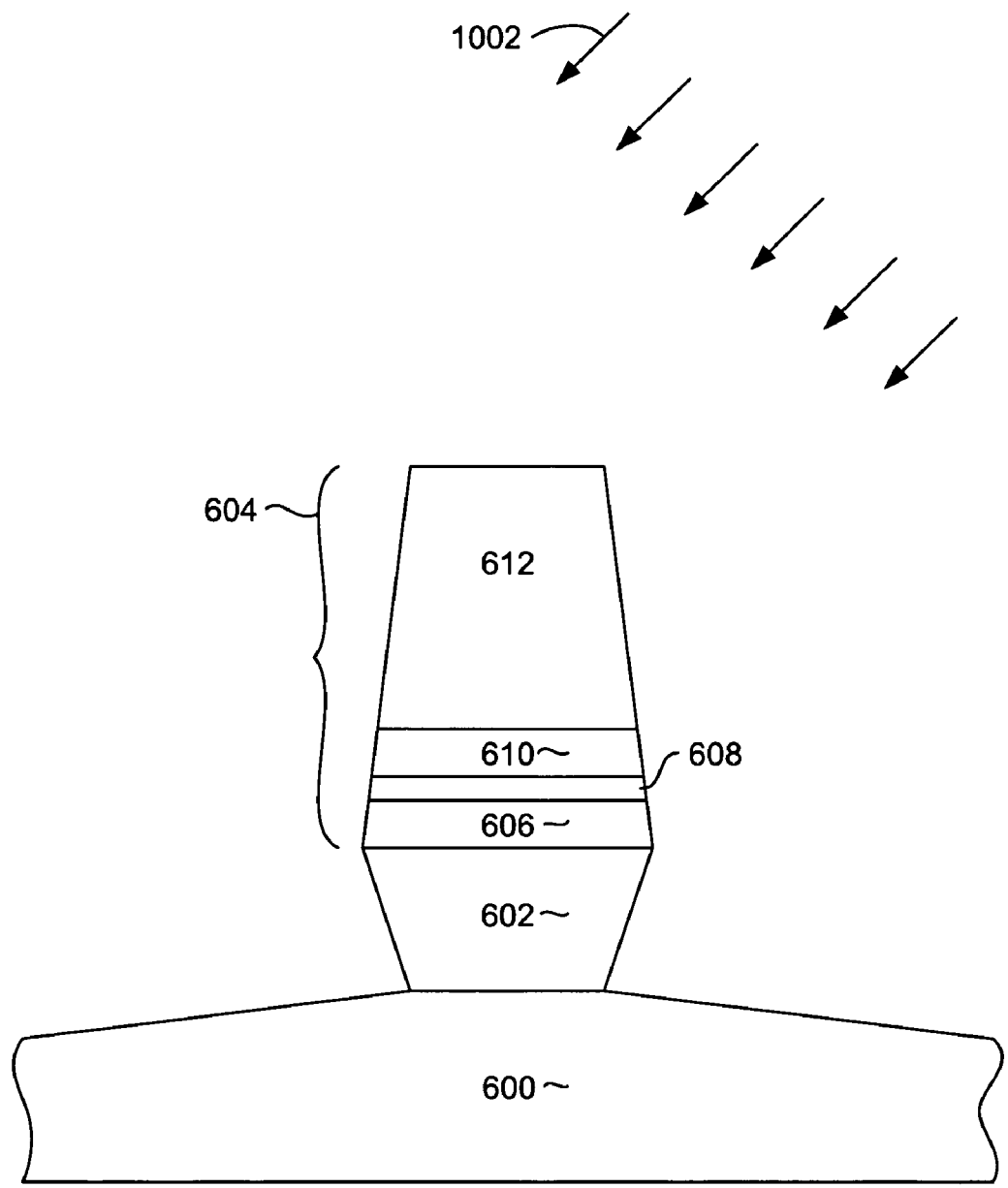
Figure 11:
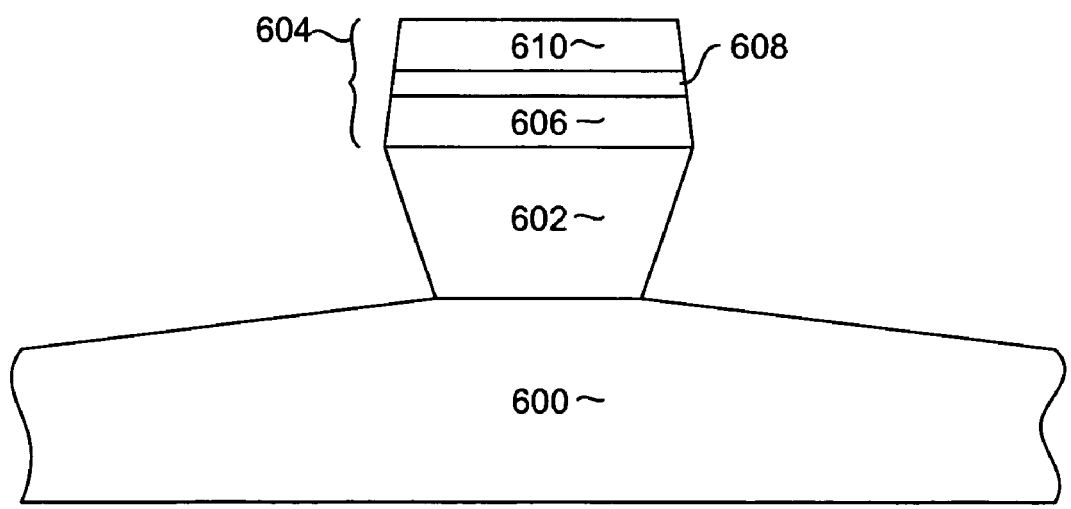

With reference now to FIG. 10, an ion mill 1002 is performed to remove write pole material 602 to form a write pole 602. The ion mill is preferably performed at an angle (or various angles) with respect to normal in order to configure the write pole 602 with the desired trapezoidal shape. This is, however, not necessary to the practice of the present invention. It can be seen that the ion mill 1002 removes the photo layer 616 top image transfer layer 616, top hard mask 614 and at least a portion of the image transfer 612 in the process of forming the write pole 602. Then, with reference to FIG. 11, the remaining image transfer layer 612 is removed such as by a tetramethylammonium hydroxide (TMAH) based etching followed by an N-methylpyrrolidinone (NMP) photoresist strip. This leaves the second hard mask layer 610, exposed.

Figure 12:
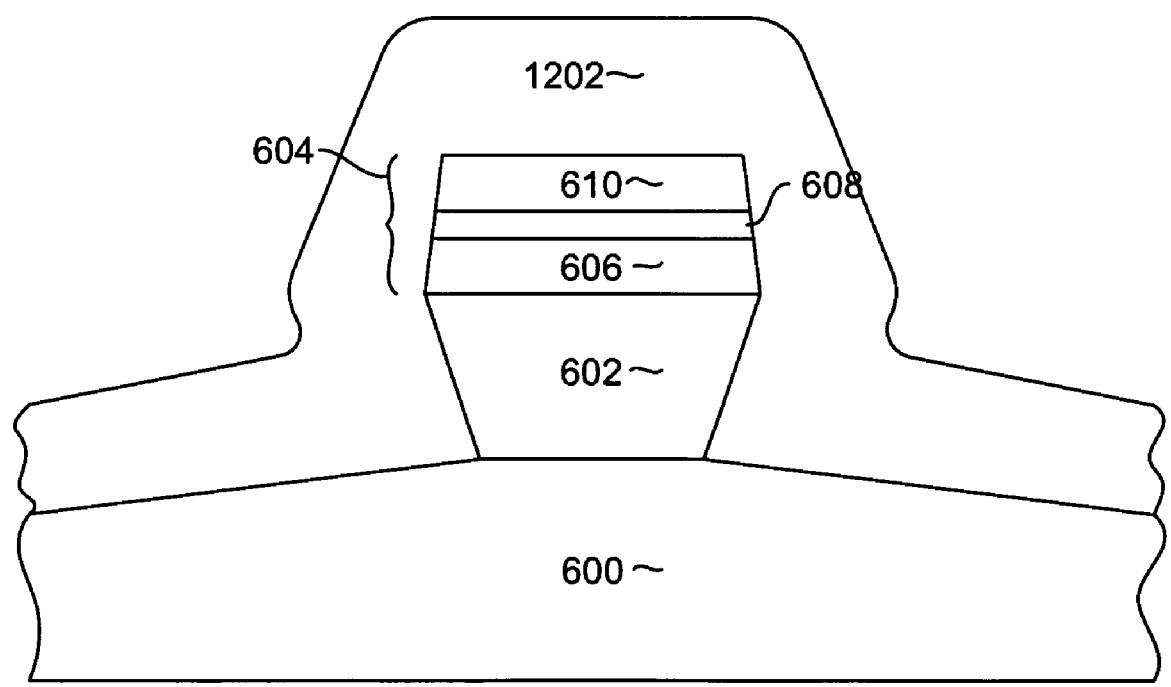

With reference now to FIG. 12, a layer of non-magnetic, side gap material 1202 is deposited. The side gap material 1202 is preferably alumina, although other non-magnetic materials could be used as well. This layer 1202 is preferably deposited by a conformal deposition method such as atomic layer deposition, chemical vapor deposition, etc. Although various material and deposition method could be used for the layer 1202, the layer will be referred to herein as ALD layer 1202.

Figure 13:
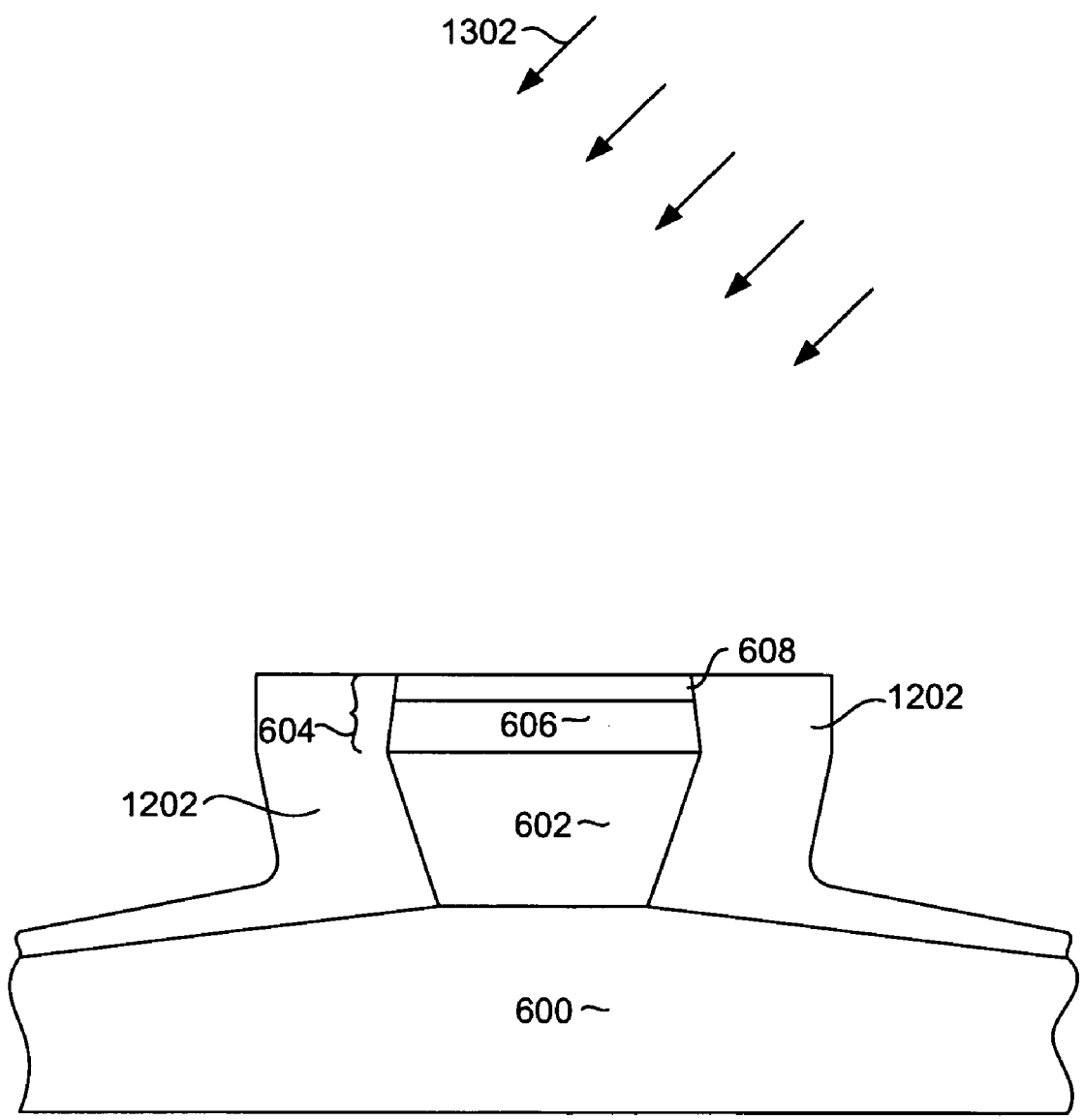

Then, with reference to FIG. 13, a material removal process 1302 is performed to remove a portion of the ALD layer 1202 and the second hard mask 610 until the ion mill end point detection layer 608 is reached. The material removal process is preferably an ion mill, performed in an Ar chemistry with end point detection (EPD). The EPD can be based on secondary ion mass spectroscopy (SIMS) or optical spectra. The ion mill is preferably performed at an angle that is chosen remove material at a high etch rate to form an upper surface on the layers 1202, 608 that is as flat as possible. It has been found that an optimal ion mill angle for this purpose is about 45 to 65 degrees or about 55 degrees with respect to normal. When the end point detection layer 608 has been reached, its presence can be easily detected in the ion mill tool, indicating that ion milling 1302 can be terminated.

Figure 14:
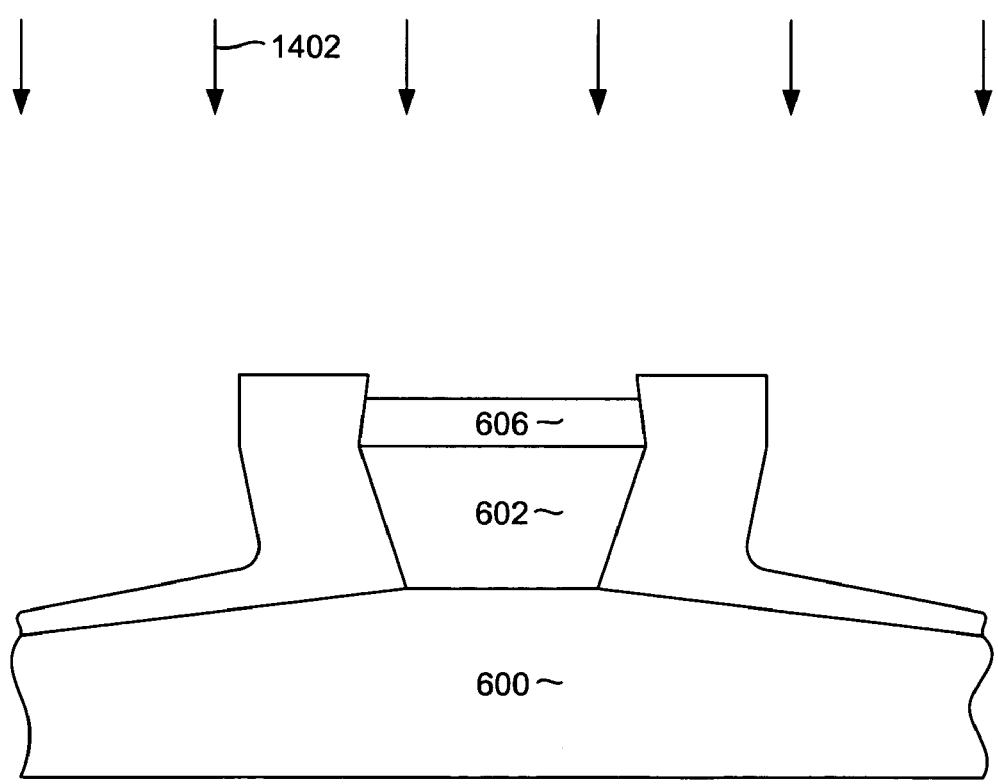
Figure 15:
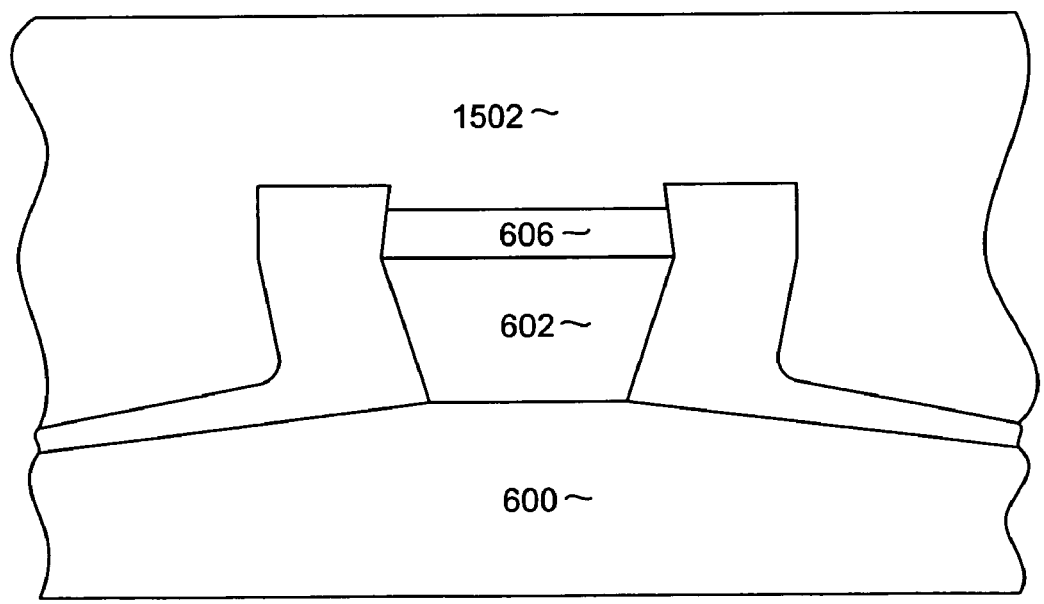

Then, with reference to FIG. 14, a reactive ion etch (RIE) 1402 is performed to remove the end point detection layer 608 leaving the first hard mask layer 606 exposed, with a straight flat surface. The RIE 1402 which may be performed in a fluorine based chemistry preferentially removes the end point detection layer 608, so that very little if any of the first hard mask layer 606 is removed. This results, not only in the layer 606 having a straight, flat surface, but also in the layer 606 having a very well controlled thickness, which thickness can be controlled at deposition of the layer 606. With reference now to FIG. 15, a wrap around trailing shield 1502 can be formed by first depositing an electrically conductive, magnetic seed layer and then electroplating to deposit a magnetic material. The seed layer and magnetic material can both be, for example, NiFe.

Figure 16:
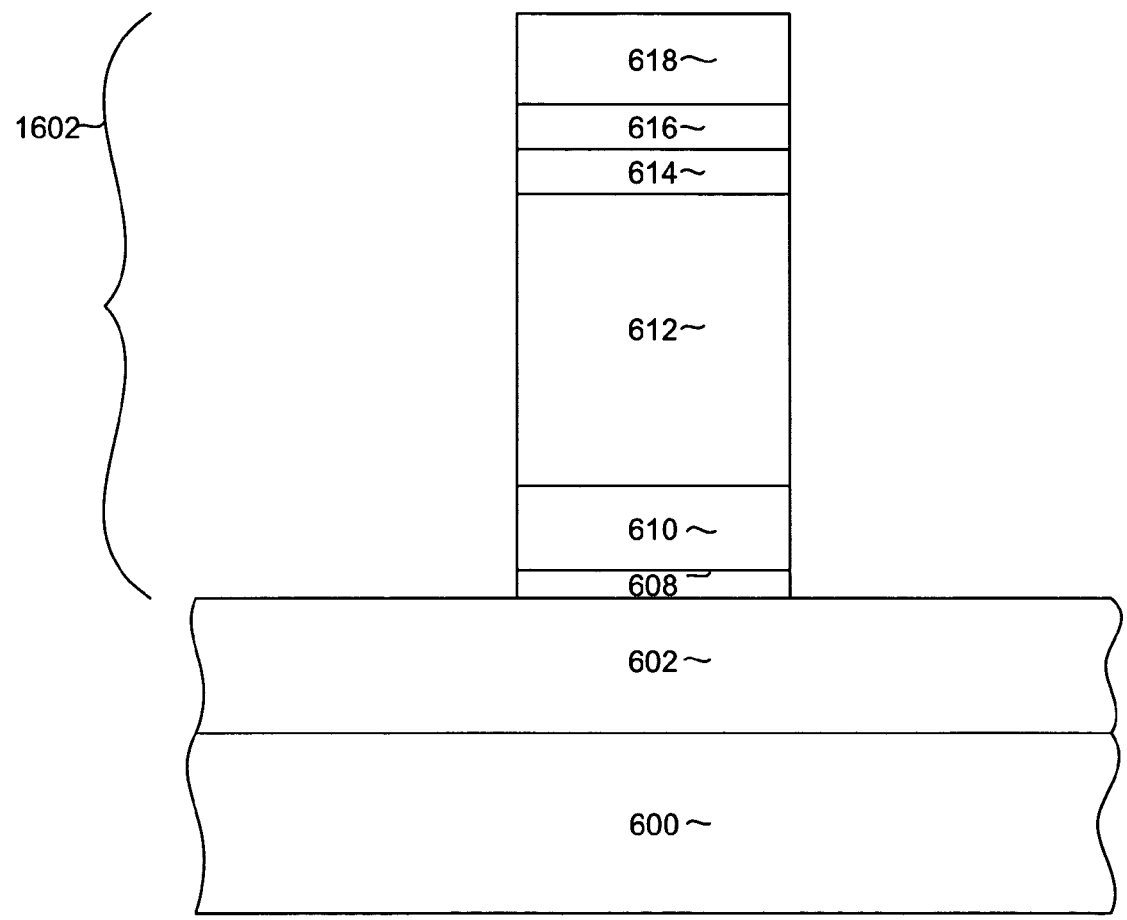
FIGS. 16-20 are views of a magnetic write head in various intermediate stages of manufacture illustrating a method of manufacturing a write head according to an alternate embodiment of the invention.
Figure 17:
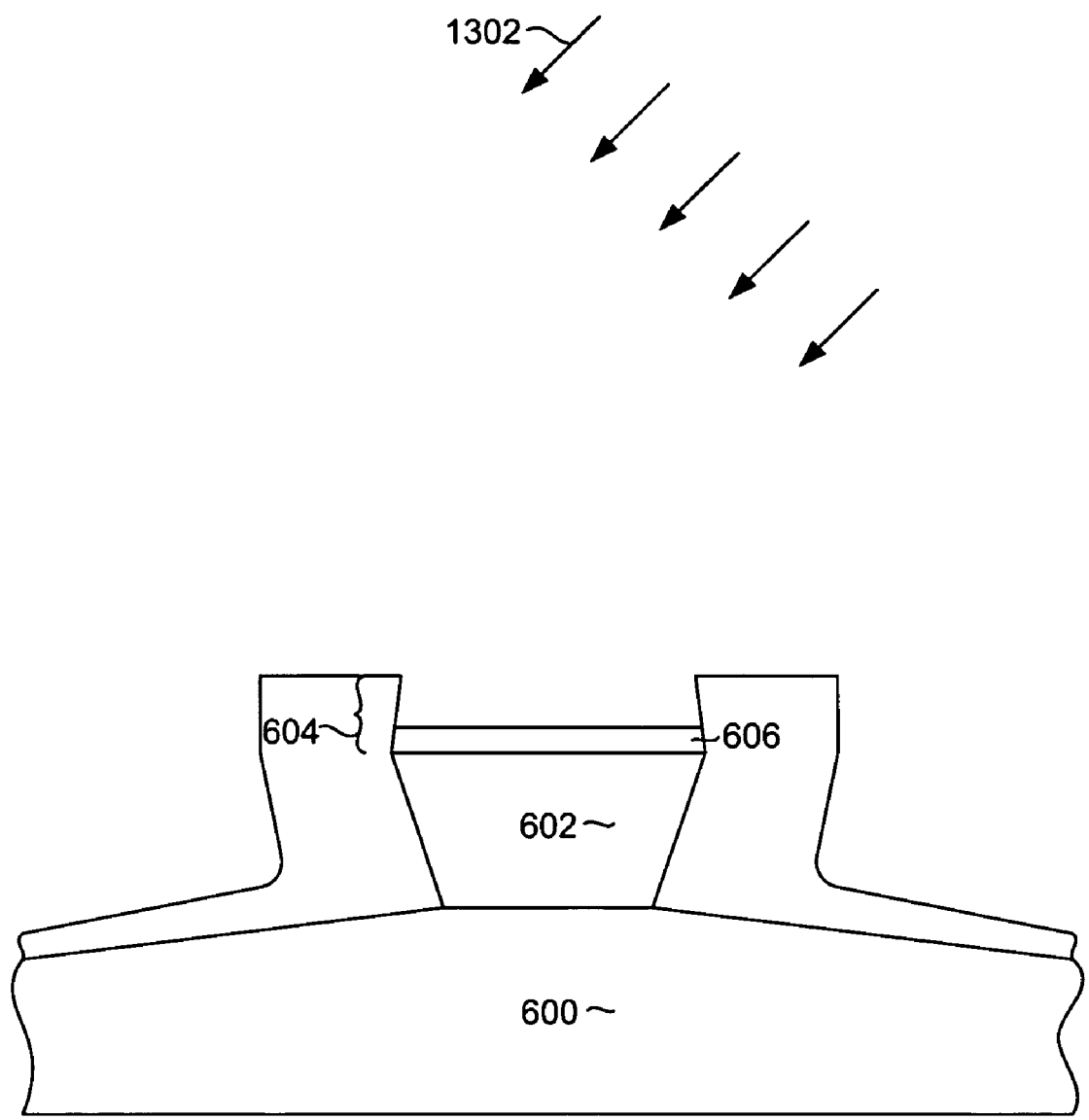

FIGS. 16-20 illustrate an alternate method of constructing a wrap around trailing magnetic shield is described. As shown in FIG. 16, a mask structure 1602 is formed over the magnetic write pole material layer 602 and has an end point detection layer 608 that is located directly on top of the magnetic pole material layer 602. As with the previously described embodiment, the end point detection layer 608 can be constructed of a material such as $Ta_2O_5$, Ta, $SiO_2$, etc. and may have a thickness of 2 to 30 nm or about 15 nm. A hard mask layer 610 is formed over the end point detection layer 608. As before, the hard mask layer can be alumina and can have a thickness of 5-75 nm or about 40 nm. The mask structure 1602 further includes an image transfer layer 612 formed over the hard mask layer and may include a second, or top, hard mask layer 614, and second image transfer layer 616. As before, the first and second image transfer layers 612, 616 can be constructed of a soluble polyimide such as DURAMIDE®, and the top hard mask 614 can be constructed of $SiO_2$ or some other suitable material. The first image transfer layer 612 can have a thickness of 1000 to 1400 nm or about 1200 nm. The top hard mask can have at thickness of 100 to 130 nm or about 115 nm, and the top, or second, image transfer layer 616 can have a thickness of 60 to 150 or about 90 nm. A photo mask 618 at the top of the mask structure 1602 defines the width of the mask structure 1602. As described in the above previous embodiment, an ion mill process can be performed to form the write pole 602 and a layer of non-magnetic material (ALD layer) 1202 such as alumina can be deposited by a conformal deposition method, as described previously with reference to FIGS. 12 and 13. Then, with reference to FIG. 17, an ion mill 1302 is performed to remove a portion of the ALD layer 1202 and all of the hard mask 608 (FIG. 16), exposing the end point detection layer 606. The ion mill 1302 is an Ar ion mill performed with EPD, and is preferably performed at an angle of 50-60 or about 55 degrees with respect to normal, as described above.

Figure 18:
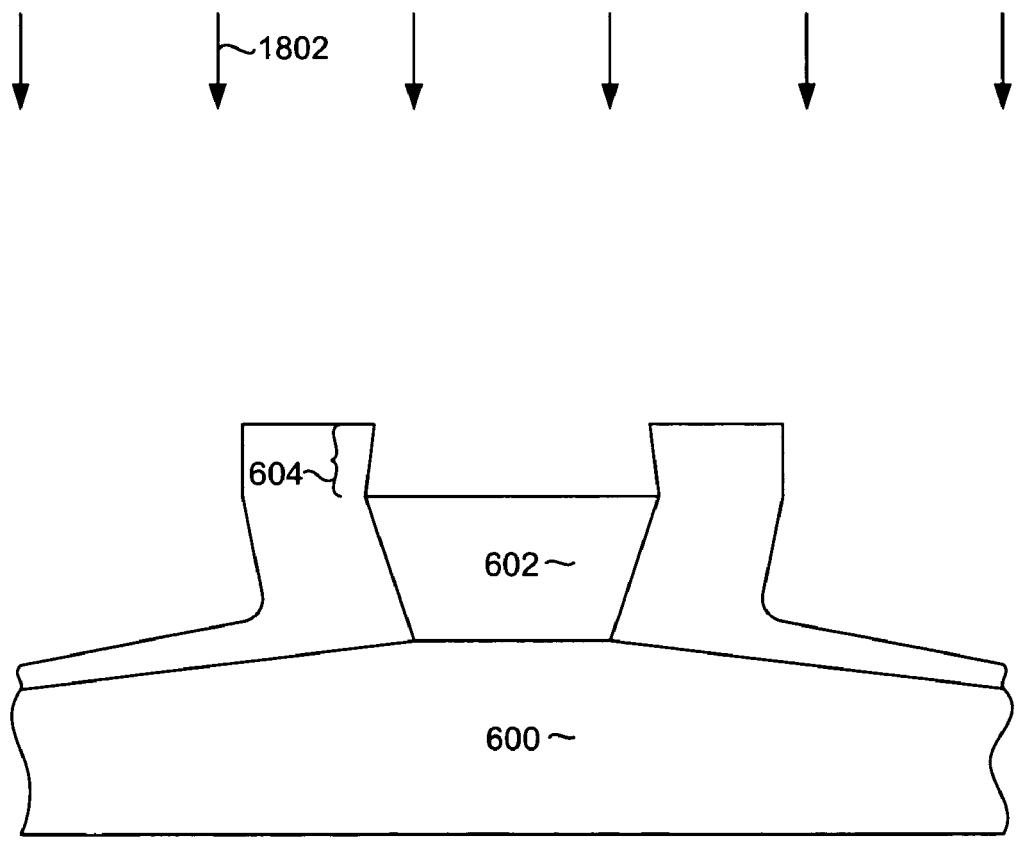
Figure 19:
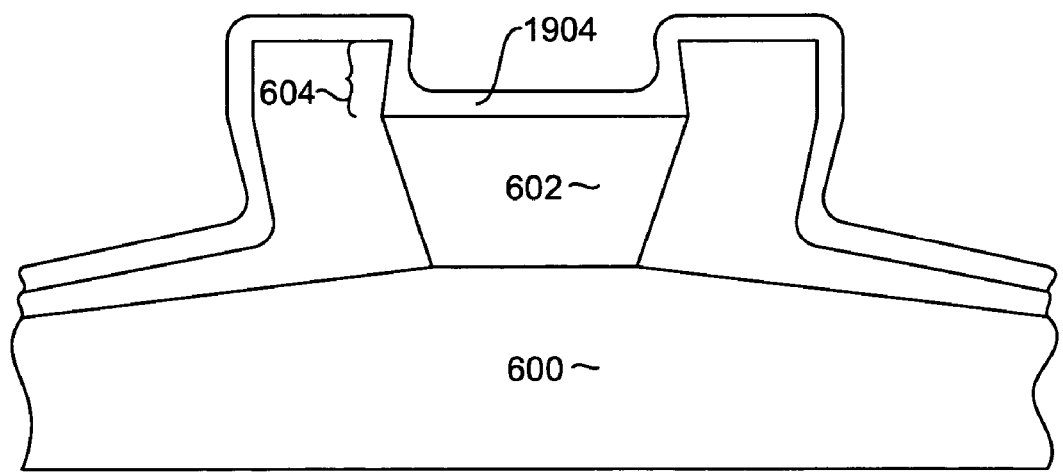

Then, with reference to FIG. 18, a reactive ion etch 1802 is performed to remove the remaining end point detection layer 606, exposing the write pole 602. Then, with reference to FIG. 19 a layer of non-magnetic material such as alumina 1902 is deposited. The layer 1902 is deposited to a thickness to define a desired trailing gap thickness. Then, with reference to FIG. 20 a wrap around trailing shield 2002 is formed by depositing an electrically conductive, preferably magnetic, seed layer and then depositing a magnetic material such as NiFe, preferably by electroplating.

Figure 20:
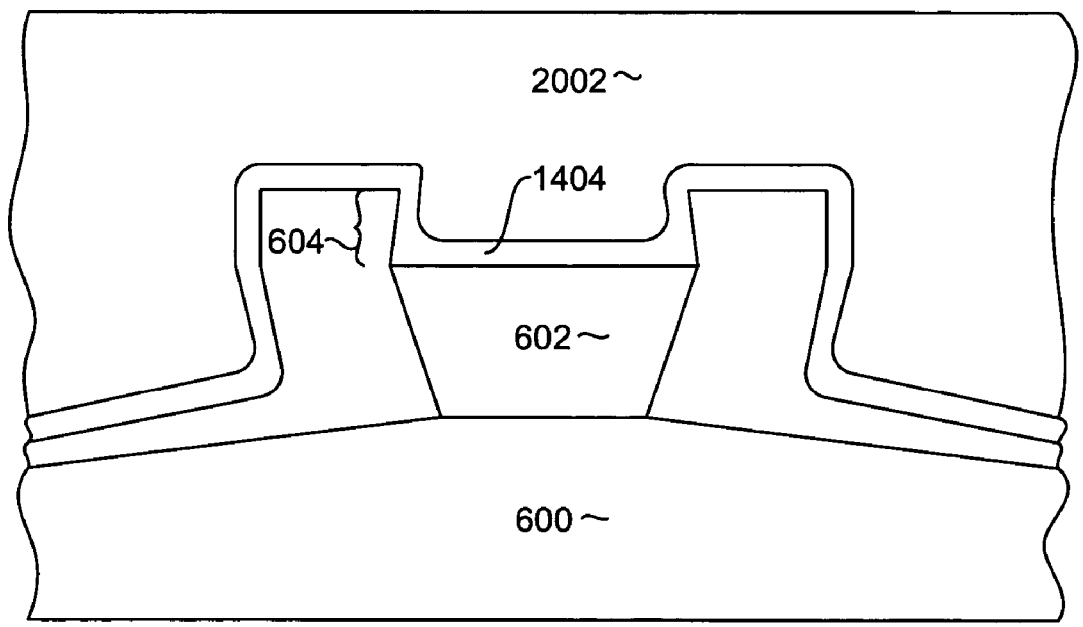

With reference again to FIG. 19, in another possible embodiment of the invention, the trailing gap defining layer 1902 can be a non-magnetic, electrically conductive layer that serves as a trailing gap as well as a seed layer for electroplating deposition of the wrap around trailing shield 2002 (FIG. 20).

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method for manufacturing a write head for perpendicular magnetic recording, the method comprising:
   providing a substrate;
   depositing a magnetic write pole material;
   forming a mask structure over the magnetic write pole material, the mask structure including a hard mask layer and an end point detection layer;
   performing a first ion mill to form a write pole;
   depositing a non-magnetic material;
   performing a second ion mill to remove a portion of the non-magnetic material layer and terminating the second ion mill upon reaching the end point detection layer;
   performing a reactive ion etch (RIE) to remove the end point detection layer; and
   depositing a magnetic material to form a trailing wrap around shield;
   wherein the non-magnetic material is an electrically insulating material, and wherein the depositing the magnetic material to form a trailing wrap around shield further comprises depositing a magnetic, electrically conductive seed layer and then electroplating the magnetic material.

2. The method as in claim 1, wherein the hard mask layer comprises alumina and the end point detection layer comprises a material selected from the group consisting of $Ta_2O_5$, Ta and $SiO_2$.

3. The method as in claim 1, wherein the second ion mill is performed in an Ar atmosphere.

4. The method as in claim 1, wherein the second ion mill is performed at an angle with respect to normal.

5. The method as in claim 1, wherein the second ion mill is performed at an angle of 45 to 65 degrees with respect to normal.

6. The method as in claim 1, wherein the second ion mill is performed in an Ar atmosphere with end point detection at an angle of 45 to 65 degrees with respect to normal.

7. The method as in claim 1 wherein the end point detection layer comprises a material having a higher atomic mass than that of the material of the hard mask layer.

8. The method as in claim 1, wherein the hard mask layer has a thickness of 5 to 30 nm.

9. The method as in claim 1, wherein the end point detection layer has a thickness of 2-30 nm.

10. The method as in claim 1, wherein the hard mask layer has a thickness of 5 to 30 nm and the end point detection layer has a thickness of 2 to 30 nm.

11. A method for manufacturing a magnetic write head for perpendicular recording, the method comprising:
    providing a substrate;
    depositing a magnetic write pole material over the substrate;
    forming a mask structure over the write pole material, the mask structure comprising a layer of alumina mask layer deposited on the write pole material and an end point detection layer deposited over the alumina mask layer;
    performing a first ion mill to remove portions of the magnetic pole material that are not covered by the mask structure to form a write pole structure;
    depositing a layer of conformally deposited alumina;
    performing a second ion mill to remove a portion of the conformally deposited alumina, the second ion mill being terminated when the end point detection layer has been reached;
    performing a reactive ion etch (RIE) to remove the end point detection layer, leaving the alumina mask layer exposed; and depositing a magnetic material to form a trailing wrap around shield;

wherein the depositing the magnetic material to form the trailing wrap around shield further comprises depositing a magnetic, electrically conductive seed layer and then electroplating the magnetic material.

12. The method as in claim 11, wherein the second ion mill is performed at an angle of 50 to 60 degrees with respect to normal.

13. The method as in claim 11, wherein the second ion mill is performed in an Ar atmosphere.

14. The method as in claim 11, wherein the second ion mill is performed in an Ar atmosphere at an angle of 45 to 65 degrees with respect to normal with end point detection.

15. The method as in claim 11, wherein the end point detection layer comprises a material selected from the group consisting of $Ta_2O_5$, Ta and $SiO_2$.

16. The method as in claim 11, wherein the end point detection layer has an element with atomic mass that is different from the atomic mass of the elements in the first hard mask layer.

17. The method as in claim 11, wherein the second ion mill removes all of the end point detection layer without subsequent RIE.

18. A method for manufacturing a magnetic write head, comprising:

providing a substrate;

depositing a magnetic write pole material over the substrate;

forming a mask structure over the write pole material, the mask structure including an end point detection layer in contact with the write pole material;

performing a first ion mill to remove write pole material not covered by the mask structure;

depositing a layer of alumina;

performing a second ion mill to remove a portion of the layer of alumina and terminating the second ion mill when the end point detection layer has been exposed;

performing a reactive ion etch (RIE) to remove the end point detection layer, exposing the write pole material;

depositing a non-magnetic layer, the non-magnetic layer being deposited to a thickness to define a trailing gap; and depositing a magnetic material to form a trailing wrap around shield;

wherein the non-magnetic material is an electrically insulating material, and wherein the depositing the magnetic material to form the trailing wrap around shield further comprises depositing a magnetic, electrically conductive seed layer and electroplating the magnetic material.

19. The method as in claim 18, wherein the second ion mill removes end point detection layer without subsequent RIE.

20. The method as in claim 18, wherein the non-magnetic material is an electrically conductive seed layer.

* * * * *